United States Patent
Chen et al.

(10) Patent No.: US 10,360,204 B2
(45) Date of Patent: Jul. 23, 2019

(54) USER DEFINED FUNCTION, CLASS CREATION FOR EXTERNAL DATA SOURCE ACCESS

(71) Applicant: Hewlett Packard Enterprise Development LP, Houston, TX (US)

(72) Inventors: Qiming Chen, Cupertino, CA (US); Meichun Hsu, Los Altos Hills, CA (US); Maria Guadalupe Castellanos, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 178 days.

(21) Appl. No.: 15/309,842

(22) PCT Filed: May 22, 2014

(86) PCT No.: PCT/US2014/039150
§ 371 (c)(1),
(2) Date: Nov. 9, 2016

(87) PCT Pub. No.: WO2015/178910
PCT Pub. Date: Nov. 26, 2015

(65) Prior Publication Data
US 2017/0161266 A1    Jun. 8, 2017

(51) Int. Cl.
*G06F 16/24*    (2019.01)
*G06F 16/26*    (2019.01)
(Continued)

(52) U.S. Cl.
CPC ............... *G06F 16/23* (2019.01); *G06F 9/44* (2013.01); *G06F 16/22* (2019.01); *G06F 16/24* (2019.01);
(Continued)

(58) Field of Classification Search
CPC ......... G06F 17/30002; G06F 17/30312; G06F 17/30386; G06F 17/30569;
(Continued)

(56) References Cited

U.S. PATENT DOCUMENTS

| 6,338,056 B1 | 1/2002 | Dessloch et al. |
| 7,155,427 B1 | 12/2006 | Prothia et al. |

(Continued)

FOREIGN PATENT DOCUMENTS

CN    102360379    2/2012

OTHER PUBLICATIONS

Andrade, et al., "Servicing Mixed Data Intensive Query Workloads", Sep. 7, 2006, 12 pages.
(Continued)

*Primary Examiner* — Jay A Morrison

(57) ABSTRACT

An example technique for defining a user function can include receiving a user defined function that gathers data from a data source external to a database and returns the data to the database. The example technique for defining the user function can also include creating an instance of a programming class that extends from an application programming interface (API). The instance of the programming class including the user defined function. The example technique for defining the user function can also include executing the user defined function provided by the instance of the programming class.

14 Claims, 3 Drawing Sheets

(51) Int. Cl.
  *G06F 9/44* (2018.01)
  *G06F 16/25* (2019.01)
  *G06F 16/23* (2019.01)
  *G06F 16/22* (2019.01)

(52) U.S. Cl.
  CPC ............ *G06F 16/258* (2019.01); *G06F 16/26* (2019.01); *G06F 2216/00* (2013.01)

(58) Field of Classification Search
  CPC .. G06F 17/30572; G06F 9/44; G06F 2216/00; G06F 16/23; G06F 16/22; G06F 16/26; G06F 16/258; G06F 16/24
  See application file for complete search history.

(56) References Cited

U.S. PATENT DOCUMENTS

| | | | |
|---|---|---|---|
| 8,005,302 B2 | 8/2011 | Lu et al. | |
| 2001/0044795 A1* | 11/2001 | Cohen | G06F 17/30699 |
| 2003/0037034 A1* | 2/2003 | Daniels | G06Q 10/087 |
| 2003/0191769 A1* | 10/2003 | Crisan | G06F 17/30483 |
| 2005/0055357 A1* | 3/2005 | Campbell | G06F 8/61 |
| 2009/0177559 A1 | 7/2009 | Kim et al. | |
| 2012/0110001 A1 | 5/2012 | Young | |
| 2012/0191642 A1* | 7/2012 | George | G06F 17/30448 707/602 |
| 2012/0239612 A1 | 9/2012 | George et al. | |
| 2013/0080413 A1* | 3/2013 | Chen | G06F 17/30516 707/706 |
| 2014/0095470 A1 | 4/2014 | Chen et al. | |

OTHER PUBLICATIONS

Baragoin, et al., "Building the Operational Data Store on DB2 UDB", Dec. 2001, 360 pages.

International Search Report and Written Opinion of the International Searching Authority, dated Jan. 30, 2015, issued in related PCT Application No. PCT /US2014/039150.

Onose, et al., "Inverse Functions in the AquaLogic Data Services Platform", In Proceedings of Very Large Data Base Endowment, VLDB '07, Sep. 23-28, 2007, Vienna, Austria, 12 pages.

* cited by examiner

USER DEFINED FUNCTION, CLASS CREATION FOR EXTERNAL DATA SOURCE ACCESS

BACKGROUND

As reliance on computing systems continues to grow, so too does the demand for data and its organization. Servers, for example, may provide architectures for implementing a database. A database can store data according to a database model. Databases with different database models may be unable to share data due to compatibility issues. That is, output data from a database may be incompatible as input data to a different database.

DETAILED DESCRIPTION

Figure 1:
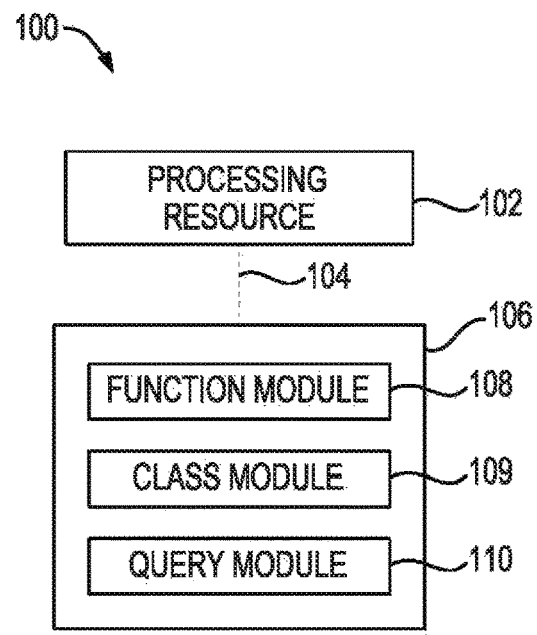
FIG. 1 illustrates a block diagram of an example of a computing device according to the present disclosure.

A system for providing user defined functions can include an application that communicates with a database management system (DBMS). The application can provide a user defined function (UDF) and an associated query to the DBMS. As used herein, the term user defined function (UDF) intends one or more functions, actions, tasks, steps, and/or instructions that have not been predefined by code or instructions in the operation of a system, e.g., not predefined by a DBMS.

A DBMS can execute queries received to the DBMS. Executing a query can include instructions for the DBMS to communicate with a data source, internal and/or external to the DBMS, to retrieve data and store the data via the UDF. In a number of examples, the application can be created using an application programming interface (API) that defines a syntax used in the query and a syntax used in communicating with the internal and/or external data source. As used herein the term syntax is intended to mean the language and set of rules governing the interface, connection, exchange and operation between computing devices, components, instruction executions, etc. The application can be used without requiring knowledge of the particular query syntax used by a particular DBMS or particular query engine and the particular communication syntax used in communicating with an internal and/or external data source.

As used herein, a DBMS is defined as a system that facilitates an interaction with a database, including control software. For example, the DBMS can facilitate the creation, querying, update, and administration of the database. A DBMS can receive instructions from users that define an action that is to be taken by the DBMS. Instructions from a user can be received in the form of a query. A query can be associated with a syntax. For example, a query can be expressed in a query language, e.g., structural query language (SQL), that is associated with the DBMS. In a number of examples, DBMSs only process queries that are expressed in a query language appropriate to the particular DBMS. As a result, communicating with a DBMS requires a knowledge and understanding of the syntax used by the query language appropriate to the particular DBMS.

Many applications may involve accessing and joining both structured data from relational databases and data from non-relational databases, e.g., non-structured data from other platforms such as Hadoop (HDFS). In order to leverage SQL's expressive power, a query engine's analytics capability, and to offer the flexibility of supporting various applications, non-relational data can be retrieved directly from a SQL query through a function-scan. Unlike a table-scan that can be used to read structured, relational data from tables in a relational database, a function-scan can be used for reading data from non-table resources such as local files, remote files, and/or systems. As used herein the term scan refers to a search of content of a particular data source platform. A table-scan refers to a search of the content of a given data source platform according to system supported access methods defined by a particular DBMS. A function-scan refers to a search of the content of a given data source platform according to a particular function that is provided by a user, e.g. an application developer. In particular, while a table-scan may be handled with a system supported access method, a function-scan may be handled by a user defined transformation function (UDTF).

As used herein, a user defined transformation function (UDTF) is a type of UDF. As noted, a UDF is defined as machine executable instructions provided by a user that provide a function not supported by the DBMS. A UDTF, as defined herein, may include instructions that are executed to get and parse data from a data source external to the underlying database of the DBMS having the query engine and return relation tuples to feed the hosting query. A tuple is an ordered list of elements. In particular, the type of UDTF defined herein may also be referred to as a user defined data source function (UDDSF). Such a UDDSF is (a) executed by a query engine, (b) interacts with an external data source, and (c) may involve application logic defined by users, e.g., application developers. Accordingly, a UDDSF has system dependencies on the query engine as well as the external data source platform. That is, a UDTF is coded by following certain patterns which represent the characteristics of the query engine, the external data source platform, and a functionality associated with the data, e.g., parsing data.

There exists a conflict between UDTF execution efficiency and the ability of application developers to easily code UDTFs-. A UDTF is run in the query processing environment with a number of interactions with a DBMS for parsing parameter, converting data, and switching memory contexts, among other functionalities associated with the UDTF. A UDTF can be executed efficiently by defining a UDTF using a DBMSs internal data structures and system calls. However, users have to deal with the hard-to-follow system details of both the DBMS and the external data source which may be beyond the users' abilities. The hard-to-follow system details may keep users away from using UDTFs.

A solution to the above problem can include creating an API that provides the hard-to-follow system details, e.g., syntax, needed to interact with the DBMS and the external data source. For example, one solution disclosed herein includes providing an API that includes a hierarchy of classes, e.g., programming classes, that provide the system details needed to interact with the DBMS, e.g., query engine, the external data source, and a mechanism for processing the retrieved data.

Providing an API that provides the system details needed to interact with the DBMS and the external data source can have a number of benefits. For example, an API that provides system details can increase semantics integrity and reliability for system interaction and make the system interaction transparent to users, e.g., application developers, database users and programmers. Further, an API that handles the system details by abstracting a hierarchy of classes can improve the correctness and reliability of UDDSFs and can make system programming easier, e.g., when programming UDTFs and UDFs in general. That is, providing the API can allow a user to develop UDTFs without requiring knowledge of system details the DBMS and/or the external data source.

As used herein, the term classes (also referred to herein as programming classes) includes instructions executed to perform a particular task, function or action in connection with developing UDDSFs or in general UDTFs. The code of a UDTF can be divided into two parts: the wrapper part and the application part (app-part). The wrapper part uses system APIs provided by the query engine to read function parameters and input data, and write output data. The app-part specifies that application specific logic. In the case of UDDSF, a major portion of the app-part is for connecting and invoking the external data service, using the system APIs provided by the external data service. Hence, as used herein the term "class", in relation to a UDDSF or in general a UDTF, can reference a "function class" and a "function wrapper class". As described in more detail below, the "function class" deals with the reading and writing of parameters, input arguments, output tuples, as well as the logic of transforming the input to the output. The function class also deals with the connection with and the retrieval of data from an external data source. The "function wrapper class", as used herein (also referred to as a function factory class) includes executable instructions and/or hardware, e.g., logic, to provide the APIs for registering the names and types of parameters, input, output, etc.

While investigating data-intensive analytics and data management in terms of UDTFs and UDFs has been investigated, extracting common operation patterns for UDDSFs has not previously been considered. Embodiments described herein provide the ability to identify the operation patterns of the UDTF and automate, or at least semi-automate, the function development accordingly. This disclosure recognizes that the way of dealing with input, output, and parameters and the way to invoking a given kind of external service are common to all the UDDSFs interacting to that kind of external service. The UDDSFs described herein are thus a unique kind of UDTFs which access external data sources to form tuples to feed queries which characterize the operational pattern of the UDDSFs allowing templates to be built for them. The templates hide from users the system interaction with the query engine as well as the selected external data engine. That is, embodiments described herein abstract these interfaces, support them systematically, and automatically, make them transparent to UDDSF developers, and therefore enhance the correctness and efficiency of UDDSF development.

In at least one embodiment, the abstracted UDDSF classes form a class hierarchy where on the top is the abstract class for all UDTFs, followed by the subclasses for using various data sources and under various data processing mechanisms. As used herein, the "class hierarchy" or "hierarchy of classes" is also referred to as a "plurality of programming classes".

Hence, one problem solved by the present disclosure is that previously the execution patterns of UDDSFs, or in general UDTFs, were not systematically supported but left to user programs which could be tedious and result in fragile code, disappointing performance and incorrect results. Very often the systems calls for wrapping such a UDDSF form the largest portion of the function body. The difficulty in programming UDDSFs for efficiently and correctly interacting with query processing actually keeps users, e.g., developers, away from using UDDSFs and in general UDTFs for their analytics applications.

In earlier attempts to ease the development and utilization of UDFs, some systems, such as SQL Server, would convert UDF's input data to strings from their system internal formats. However, this approach causes significant overhead in converting data and parsing parameters. Thus, no matter how simple a UDF is, it sharply underperforms compared with a system function or expression. In other database systems, e.g., Postgres, UDFs are coded in exactly the same way as system functions, which allows the UDFs to be executed efficiently, but requires the UDF developer to deal with tedious DBMS internal data structures and system calls, which, in fact significantly contrasts to the easy coding of map( ) and reduce( ) functions on a MapReduce platform such as Hadoop where the system support are completely transparent to users.

FIG. 1 illustrates a block diagram of an example of a computing device according to the present disclosure. The computing device 100 can include a processing resource 102 connected to a memory resource 106, e.g., a computer-readable medium (CRM), machine readable medium (MRM), database, etc. The memory resource 106 can include a number of computing modules. The example of FIG. 1 shows a function module 108, a class module 109, and a query module 110. As used herein, a computing module can include program code, e.g., computer executable instructions, hardware, firmware, and/or logic, but includes at least instructions executable by the processing resource 102, e.g., in the form of modules, to perform particular actions, tasks, and functions described in more detail herein in reference to FIG. 3.

The function module 108, as used herein and as will be explained in more detail in connection with FIGS. 2 and 3, can include instructions that are executed by the processing resource 102 to receive a user defined function (UDF). In association with integrating data analytics, queries to query engines and data management in database management systems (DBMSs) a UDF, and in particular a user data transfer function (UDTF) executes instructions to gather data from a data source external to a database and to return the data to the database.

A class module 109 includes instructions that are executed by the processing resource 102 to create an instance of a programming class that extends from an application programming interface (API). An instance in object oriented programming is a specific realization of any object. In class based programming, an object is an instance of a class, e.g., an instance of a programming class. The instance of the programming class includes the UDF. In at least one embodiment the UDF is a user defined data source function (UDDSF). A query module 110 includes instructions that are executed by the processing resource 102 to operate on the UDF, e.g., the UDDSF, as provided by the instance of the programming class.

The number of modules shown in FIG. 1 (e.g., function module 108, class module 109, and query module 110) can be combined with other modules or be sub-modules of other modules. The modules can be stored in a single memory resource 106 as shown in FIG. 1 and/or be contained within the same computing device. In another example, the number of modules (e.g., function module 108, class module 109, and query module 110) can comprise individual modules at separate and distinct locations on different memory resources (e.g., CRM, etc.) such as in a distributed computing environment, e.g., cloud computing environment. Further, the processing resource 102 executing instructions associated with a particular module, e.g., function module 108, class module 109, and query module 110, can function as an engine, such as the example engines shown in FIG. 2.

Figure 2:
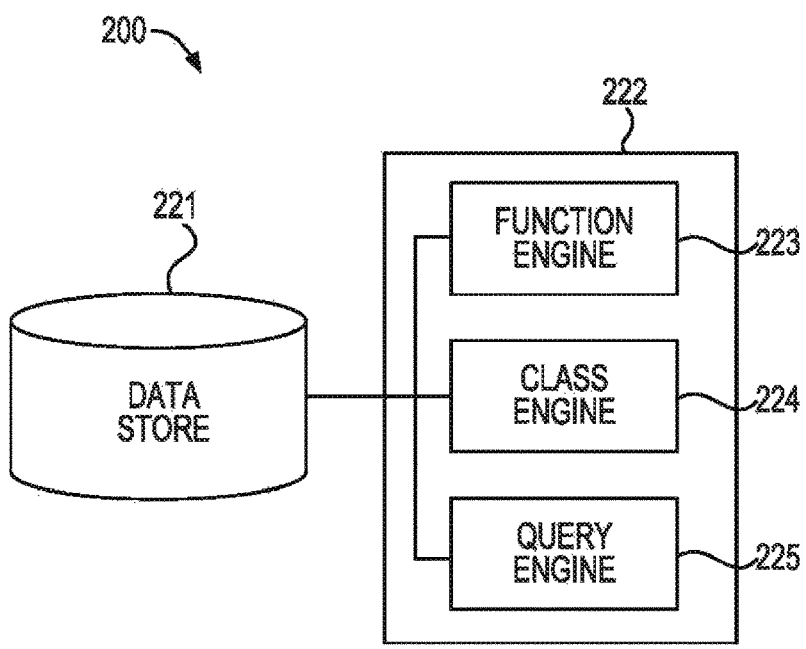
FIG. 2 illustrates a block diagram of an example of a system for providing a user defined function according to the present disclosure.

FIG. 2 illustrates a block diagram of an example of a system for providing a user defined function according to the present disclosure. The system 220 can perform a number of functions and operations as described in FIG. 3, e.g., defining a user defined function. The system 220 can include a data store 221 connected to a user defined function system 222. In this example, the user defined function system 222 can include a number of computing engines. The example of FIG. 2 shows a function engine 223, a class engine 224, and a query engine 225. As used herein, a computing engine can include hardware firmware, logic, and/or executable instructions, but includes at least hardware e.g., a processor, transistor logic, application specific integrated circuit (ASIC), etc., executing instructions to perform particular actions, tasks and functions described in more detail herein in reference to FIG. 3.

In the example of FIG. 2, the function engine 223 can include hardware and/or a combination of hardware and programming (e.g., executable instructions), but at least hardware, to receive a user defined function (UDF). A class engine 224 can include hardware and/or a combination of hardware and programming, but at least hardware, to create an instance of a programming class that extends from an application programming interface (API). The instance of the programming class includes the UDF and in at least one embodiment the UDF is a user defined data source function (UDDSF). A query engine 225 can include hardware and/or a combination of hardware and programming, but at least hardware, to operate on the UDF, e.g., the UDDSF, as provided by the instance of the programming class.

The function engine 223, the class engine 224, and the query engine 225 shown in FIG. 2 and/or the function module 108, the class module 109, and the query module 110 shown in FIG. 1 can be sub-engines/modules of other engines/modules and/or combined to perform particular actions, tasks, and functions within a particular system and/or computing device. Further, the engines and/or modules described in connection with FIGS. 1 and 2 can be located in a single system and/or computing device or reside in separate distinct locations in a distributed computing environment, e.g., cloud computing environment. Embodiments are not limited to these examples.

Figure 3:
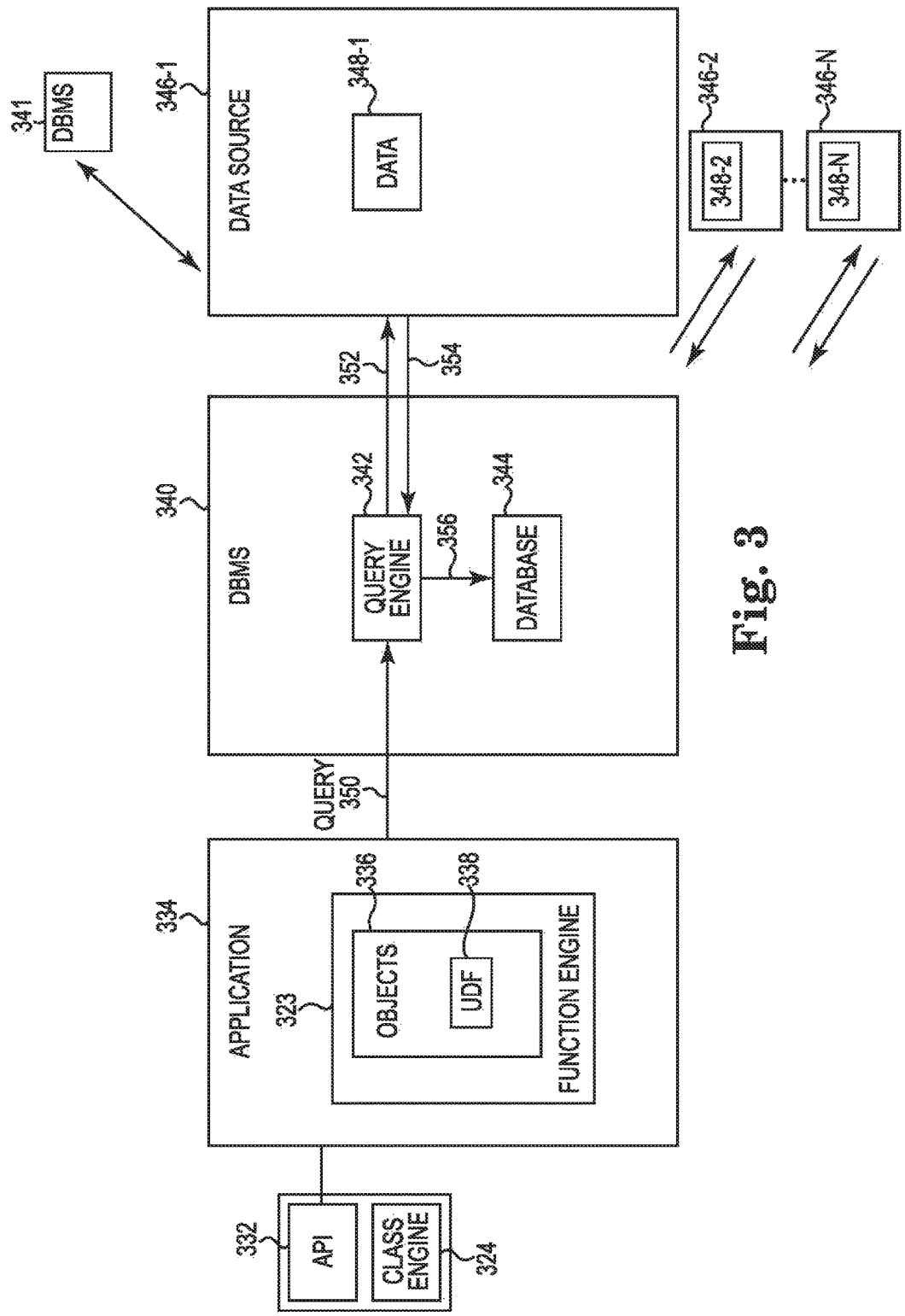
FIG. 3 illustrates a block diagram of an example of a system for providing a user defined function according to the present disclosure.

FIG. 3 illustrates a block diagram of an example of a system for providing a user defined function according to the present disclosure. FIG. 3 illustrates an API 332 associated with a class engine 324. The API can communicate with an application 334 having object code (e.g., programming objects) and can include instructions that can be executed to create a user defined function (UDF) 338. As described herein the UDF can include a user defined transfer function (UDTF), and in particular a UDDSF. The application is associated with a function engine 323. The application 334, UDF 338, and function engine can generate a query 350 and communicate that query 350 to a query engine 342 associated with a database management system (DBMS) 340. The DBMS has internal data structures and system calls and one or more associated databases 344.

As shown in FIG. 3, the query engine 342 of the DBMS 340 can generate a query 352, e.g., using the UDDSF, to communicate with one or more external data sources, e.g., 346-1, 346-2, ..., 346-N, each of which can include data 348-1, 348-2, ..., 348-N, respectively. An external data source, e.g., 346-1, may be associated with a different DBMS 341 from DBMS 340 as part of a different data source platform, a Hadoop data file system (HDFS) platform. As described herein, the function engine 323 receives a UDF, e.g., UDTF, and can operate on the same to develop the UDDSFs as an instance of the hierarchy of programming classes (abstracted UDDSF classes) retrieved only with java system calls to the API 332. This UDDSF can then gather data from a data source, e.g., 346-1, external to the database 344 associated with the DBMS 340 without requiring knowledge of the semantics, characteristics, and syntax of a particular DBMS, query engine, and external data source platform. The UDDSF gets and parses the return data 354, received in response to the query 350 from the application 334 and the query 352 from the query engine 342 of the DBMS 340 to the external data source 346-1. In particular the UDDSF can return relation tuples to feed the hosting query, e.g., query engine 342.

DBMS 340 is illustrated including a query engine 342, e.g., query module 110 in FIG. 1 and query engine 225 in FIG. 2, and access to one or more platform databases, e.g., database 344. As mentioned above, the DBMS 340 can include executable instructions to manage the data stored in the one or more platform databases 334 and the internal data structures associated with the databases 334. In DBMS 340, for example, the databases 334 can be relational databases. The relational databases can store data in tables according to a relational model that conforms to first-order predicate logic. In a relational model, data is represented in tuples that are grouped into relations. The DBMS 340 internal data structures, system calls, syntax, etc., can define the tables and the associated interactions with the databases 334. In another example, the one or more databases 334 can be implemented using a non-relational databases. A non-relational database is further explained in association with data sources 346-1, 346-2, 346-N.

The DBMS 340 can receive instructions from a user. The instructions can define a number of actions to be taken by the DBMS 340. The instructions received from the user can include queries that conform to a query language. The query language can be specific to a query engine 342 that processes the queries. For example, the query engine 342 can process queries that conform to an SQL.

A query engine 342 can include machine executable instructions used to process instructions on actions associated with the database 334. A query engine 342 can perform the actions using an API, e.g., API 332, associated with the query engine 342.

In a number of examples, the query engine 342 can process queries according to a query language that can include a number of patterns. For example, a query language can include patterns that are associated with predefined method calls. A specific pattern can be used to implement and execute a create table method, for instance. The pattern can describe, for example, variables that are used to invoke a particular method. A pattern can also describe the results associated with executing the method. For example, returned data associated with the execution of a method can conform to a pattern.

In a number of examples, the DBMS 340 may be instructed via a query 350 to retrieve data from a particular external data source, e.g., 346-1, 346-2, . . . , 346-N. The external data sources 346-1, 346-2, . . . , 346-N, shown in FIG. 3, can be a file, a database, a data source platform, e.g., data source/DBMS (346-1/341), among other examples of a source of data.

Thus, the data source can be a data source 346-1 external to the database 344. A data source 346-1 that is not integrated and/or is separate from the database 344 is an external data source 346-1. The data source, e.g., 346-1, can further be associated with a different DBMS, e.g, DBMS 341 and, for example, the data source 346-1 can include a non-relational database.

A non-relational database can store data in a model other than a relational model. A non-relational database can store data according to a tree model, a graph model, and/or a key-value model, among other examples of models that can store data.

Hence, DBMS 340 can be different than a DBMS, e.g., 341, that is associated with the data source 346-1. Accordingly, the DBMS 340 can process queries that conform to a query language that is different than a query language that is used to process queries by another data source/DBMS combination, e.g., 346-1/341.

The DBMS 340 can communicate with the another data source/DBMS combination, e.g., 346-1/341, via a table-scan when both DBMSs are associated with a same query language, e.g., both include relational databases. That is, both DBMSs 340 and 341 are associated with a same query language if, for example, both DBMSs are associated with relational databases. Often, however, this will not be the case as today many enterprise applications require accessing and joining both structured data from relational databases (RDBs) and unstructured data from other platforms such as Hadoop, e.g., having non-relational data and databases.

In such cases, as noted above, a query 350 may be provided to a DBMS 340 and the query 350 can include instructions to the DBMS 340 to retrieve data from a particular external data source, e.g., 346-1. The query 350 can include instructions to implement a function-scan or a table-scan to retrieve the data. A table-scan can be used to retrieve data from a relational database. A function-scan can be used to retrieve data from a non-relational database. A function-scan is one way to leverage SQL's expressive power and query engine's analytics capability, and to offer the flexibility of supporting various applications, to retrieve non-relational data directly from a SQL query. A function scan is the mechanism for reading data from non-table resources such as local or remote, e.g., external, files or systems. A function scan is handled by user defined transformation functions (UDTFs). A table-scan can be processed using system supported access methods, e.g., internal data structures and system calls in a relational database DBMS. That is, a table-scan can be pre-defined. A function-scan is not supported using system access methods. The function-scan is supported using the user defined functions (UDFs) 338, e.g., UDTFs.

A UDF 338 can be provided via a function engine 323, function module 108 and/or the function engine 223 in FIG. 1 and FIG. 2, respectively, e.g., based on user, application developer or system developer input. For ease of discussion and illustration, a "user" may sometimes be stated in connection with certain actions of this disclosure. However, the reader will appreciate that inputs associated with and referred to as a user defined function (UDF) may come from many sources, including instructions executing and operating on other executed instructions. Thus, embodiments of this disclosure are not intended to be limited to physical, e.g., human, user actions or interactions with and between computing modules and/or computing engines.

A UDF 338 can provide a number of steps and/or instructions that have not been pre-defined by the DBMS 340. In a number of examples, the UDF 338 can be a UDTF. A UDTF can be executed to get and parse data 348 from the data source 346-1 that can be external to the database 344. The UDTF can be executed by the query engine 342 to cause the DBMS 340 to interact with the external data source 346-1.

A UDTF can have system dependencies on the query engine 342 and an external data source platform, e.g., DBMS 341 associated with the data source 346-1. The UDTF is defined as computer (e.g., machine) executable instructions that provide patterns which represent the characteristics of the query engine, the external data source 346-1 platform, and a transformation functionality or any other functionality needed to implement the UDTF.

For example, a UDTF can instructions that are executed to provide instructions via a query 352 that can be executed to request data 348 from an external data source 346-1. The data source 346-1 can return data 348 to the UDTF. The UDTF can transform the data 348 received from the data source 346-1 into relation tuples to feed to the query 350 that caused the UDTF to be executed.

The transformed data 348 can be stored in the database 344. That is, at 356 the transformed data 348 can be sent from the query engine 342 to the database 344. The database 344 can store the data received from the query engine 342. In a number of examples, the database 344 would not be able to store the data 348 if the data 348 had not been transformed.

In a number of examples, a user, e.g., application and/or system developer, can provide the query 350 to the DBMS 340 via an application 334. Providing the query 350 without the use of an application 334, according to embodiments described herein, would involve a user, e.g., application developer, analytics user, etc., knowing the syntax, semantics and system details of a system's query engine, external data source engines, internal data structures and system calls to operate efficiently and correctly. Knowing the correct query language associated with query 350 and for a query language associated with a query 352 to an external data source, e.g., having unstructured data and non-relational databases leads to difficulty in programming UDTFs, and in particular UDDSFs. The knowledge of the multiple, different query languages may act as a barrier to a user. As such, a user, e.g., applications developer, analytics user, etc, may be reluctant to implement a UDTF because the user does not know at least one of the query languages associated with query 350 and/or the query language associated with query 352.

Thus, according to at least one embodiment, an API 332 is provided which abstracts the syntax associated with multiple query languages to relive the user from having to learn multiple query languages. For example, the API 332 can abstract a hierarchy of (e.g., number of) programming classes using a class engine 332, class engine 224 in FIG. 2 and/or a class module 109 in FIG. 1. The API 332 thus abstracts an interface to a data source platform via a plurality of programming classes. The abstracted hierarchy of programming classes allows templates to be created, e.g., built, for UDTFs, various data sources, and various data processing mechanisms. Hence, a programming class is defined as an established template for creating objects 336, which may be operated upon using a function engine 323. A programming class can be written using a programming language that can provide computer, e.g., machine, executable instructions for performing a number of functions associated with providing a query and a UDTF, etc. As used in this disclosure, a programming class may also be sometimes be referred to as a class.

A UDF 338 may be provided by a user to the application 334 and operated upon by the function engine 323 to interface with the abstracted hierarchy of programming classes created by the class engine 324 of the API 332. The function engine 323, function engine 224 in FIG. 2 and/or a function module 108 in FIG. 1, can operate on the UDF to create correct and reliable UDDSFs through interaction with the API 332, regardless of a given system's semantics, query engine and/or the extent of their knowledge of external data source platforms.

The API 332, class engine 324, and function engine 323 can cooperate to cause the application 334 to send the query 350 to the DBMS 340 and to cause the DBMS 340 to send the query 352 to the data source 346-1 in a manner transparent to users', e.g. UDTF developers, analytics users/developers, etc., understanding of the characteristics of a given query engine, external data source platform and transparent to the users' understanding of system APIs provided by the query engine as well as system APIs provided by another data source platform. The API 332 can include a number of templates, e.g., classes, that can be used by the user to communicate with the DBMS 340 and the data source 346-1.

A user can implement, via the class engine 324, class engine 224 in FIG. 2 and/or the class module 109 in FIG. 1, a hierarchy, e.g., plurality, of programming classes from the API 332 by creating objects 336 that define the application 334. A user can create an instance of the particular class by providing a number of parameters and a UDTF. As used herein, an instance of a class is defined as a specific realization of a class in an API 332. The user can, for example, create an object 336 by compiling a class that has been defined by a user to include a UDF 338. The object 336 can be an instance of a class in the API 332. A user can define the number of classes by providing parameters when implementing the number of classes and/or by providing application specific code that causes the UDF 338 to implement a number of operations.

The API 332 can have a class hierarchy that includes a top class that can be an abstract class for all classes that can be used to implement a UDF 338. The API 332 can be implemented using any number of API's associated with any number of programming languages. In a number of examples, the API 332 is implemented without referencing an API provided by the query engine 342, the DBMS 340, and/or a platform associated with the data source 346-1, e.g., DBMS associated with the data source 346-1.

In a number of examples, the object 336 can refer to a single object or multiple objects. The multiple objects can be created from a single class or multiple classes, for instance.

Figure 4:
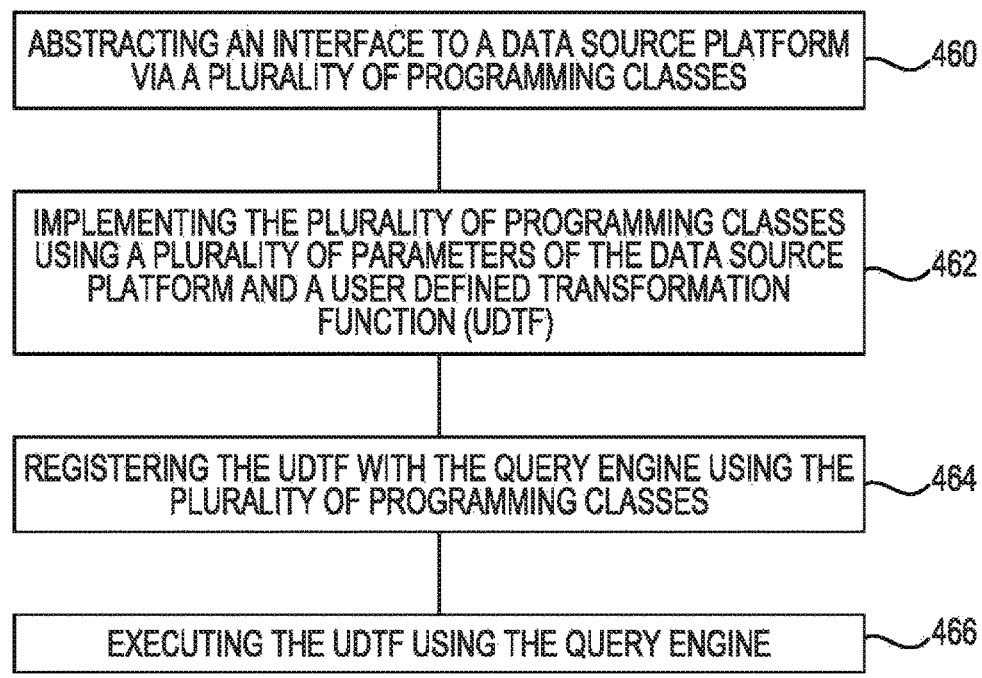
FIG. 4 illustrates a flow diagram of an example of a method for registering a user defined function according to the present disclosure.

FIG. 4 illustrates a flow diagram of an example of a method for registering a user defined function according to the present disclosure. A UDTF can be divided into a wrapper part and an application part. The wrapper part uses system APIs provided by the query engine to read function parameters and input data, and write output data. The application part specifies the application specific logic. The application part can include machine executable instructions, e.g., code, to connect and invoke the external data source using the system APIs provided by the external data source. The instructions associated with connecting to and invoking the external data source can be abstracted. That is, the interfaces associated with the data source can be abstracted to make the interfaces transparent to the UDTF developers and therefore enhance the correctness and efficiency of UDTF development.

The following statement is an example of a query that can be used to register a UDTF, e.g., TextMiningEngineSuggestUdxFactory (for TextMiningEngineSuggestUdx), to a DBMS by name getTextMiningEngineSuggest.

CREATE LIBRARY TextMiningEngineLib AS 'examples/TextMiningEngine.jar' LANGUAGE 'Java': create transform function getTextMiningEngineSuggest as name 'com. TextMiningEngineSuggestUdxFactory' library TextMiningEngineLib;

The above UDTF can, for example, send one or more key words to a text mining engine to find the related news, return the summary of the news, the sources, and match scores, etc., as relation tuples to the host query for further SQL-based analytics. The simplest SQL query invoking the above function can be:

select getTextMiningEngineSuggest('Software Company' using parameters
servers='awe.example1.com:123:news_moreover,
awe.example1.com:123:news,
textminingengine1.example1.example.com:1234:
reuters1', hosts=3) over (partition by magic) FROM Partitioner;

In the above function call, the input argument is static as 'Software Company'. There exist two parameters, servers and hosts, the servers specify the URLs of the text mining text mining engines as multiple text mining engines maintaining news from different sources are contacted. The hosts specify the number of nodes to be used in processing the query and the workload of contacting the external text mining engines will be evenly distributed to these nodes.

An alternative query that gets input arguments from a table, e.g., company is listed below:

select getTextMiningEngineSuggest(c.name using parameters servers='awe.example1.com:123:news_moreover,awe.example1.com:123:news,
textminingegine1.example1.example.com:1234:
reuters1', hosts=3) over (partition by magic) FROM Partitioner, company c;

As another example, a query using a UDTF to feed in data from a file in a specific file system is illustrated below:

select count(*), Hostname from (SELECT lrscan(60 using parameters
file='hdfs://seaflow.example1.example.com:12345/data/
LR3hours.txt', chunk=64000, hosts=4) OVER (partition by magic) FROM Partitioner) r group by Hostname;

This query retrieves data from file hdfs://seaflow, example1.example.com:12345/data/LR3hours.txt with an approximately balanced load.

At 460, an interface to a data source platform can be abstracted via a plurality of programming classes. The classes can be used to abstract patterns associated with the query engine 342 and the data source 346-1 in FIG. 3. The plurality of programming classes can be implemented using a plurality of parameters of the data source platform and a UDTF.

A user UDTF can be developed with a function class and a function wrapper class. In a number of examples, other types of classes and/or number of classes can be used to develop a UDTF. A function class can read parameters, write parameters, input arguments, and/or output tuples, as well as the logic of transforming the input to the output. A function class can also deal with the connecting to and/or retrieving data from the external data source. The function wrapper class, referred to as function factory class, provides the APIs for registering the names and types of parameters, input, and/or output, among other parameters that can be registered, for example.

At 462, the classes can be implemented using a plurality of parameters associated with retrieving data. For example the classes can be implemented using parameters that are associated with a query to the data source and/or parameters that used in the UDTF. For example, an interfaces provided by the abstract UDTF class can include:

```
public abstract class AbstUdtf extends TransformFunction {
        ......
        public String inputTypes = null;
        public String outputSchema = null;
        public String parameterTypes = null;
        public void initialize(Object[ ] argv) { }
        public void finalize( ) { }
        public abstract ArrayList<ArrayList> processRecord(
Object[ ] argv, Array List<Object> tuple);
        ......
}
```

This abstract class defines the schemas (type, name) of input, output arguments, and parameters to be specified by the UDTF developer, such as:

```
InputTypes = "varchar";
outputSchema = "hostname:varchar(20), input:varchar(20),
ref_id:varchar(500), ...";
parameter-Types = "host:varchar(128), port:varchar(16),
db:varchar(32)";
```

From the values of these variables, e.g., parameters, the UDTF can be configured to generate Object[ ] argv as parameters, ArrayList<Object> tuple as input tuple. The UDTF can also be configured to convert a list of resulting values into a tuple acceptable by the host query, e.g., query 350 in FIG. 3.

The connection to the data source and the necessary instructions for handling the input data can be initiated in initialize(Object[ ] argv). The instructions to close the connection and other cleanup operations can be put in finalize( ). The above instructions can also be treated as system calls in a substantial abstract UDTF class that is a subclass the top level UDTF class,
    public void initialize(Object[ ] argv){ }
    public void finalize( ){ }
The abstract method that is implemented by the UDTF is based on an its application logic which can be stored as:
    public abstract ArrayList<ArrayList> processRecord(Object[ ] argv, ArrayList<Object> tuple);
In a number of examples, the UDTF can be used to parse and/or filter the input data. Parsing and/or filtering the input data can be examples of a transformation of the data 348 before it is stored in the database 344 in FIG. 3.

A user can implement the above abstract class, for example, by creating a class that extends from the AbstUdtf class and providing the parameters needed by the AbstUdtf class. Furthermore, a user can implement a corresponding UDTF factory class.

At 464, a user can compile number of implemented classes to create a number of objects, e.g., object 336 in FIG. 3, that can define an application, e.g., application 334 in FIG. 3. The application can be used to provide instructions to a DBMS that is associated with a database to register the UDTF and parameters that are associated with the UDTF with the DBMS. In a number of examples, registering the UDTF with the DBMS can include registering the UDTF with the database and/or with a query engine. That is, the implemented classes can be used to register the UDTF with a query engine that is associated with the DBMS.

At 466, the application can provide instructions to the DBMS to execute the UDTF using the query engine. The instructions can be in the form of a query that the application provides to the DBMS. The DBMS can then implement the UDTF to gather data from a data source as described in FIG. 3.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. The proportion and the relative scale of the elements provided in the figures are intended to illustrate the examples of the present disclosure, and should not be taken in a limiting sense.

The specification examples provide a description of the applications and use of the system and method of the present disclosure. Since many examples can be made without departing from the spirit and scope of the system and method of the present disclosure, this specification sets forth some of the many possible example configurations and implementations.

As used herein, "a" or "a number of" something can refer to one or more such things. For example, "a number of widgets" can refer to one or more widgets.

What is claimed:

1. A system for user defined functions, comprising:
    a processor; and
    a computer-readable medium comprising machine-readable instructions executable by the processor to:
    receive a user defined function, wherein the user defined function is to gather data from a data source external to a database utilizing a function-scan that searches content from a non-table resource of the data source according to a particular function and to return the data to the database;
    create an instance of a programming class that extends from an application programming interface (API), wherein the instance of the programming class includes the user defined function and a number of user-defined parameters for gathering the data from the data source external to the database, and enables a template that allows a user to communicate with the database and the data source external to the database; and
    execute the user defined function provided by the instance of the programming class to gather the data from the data source external to the database.

2. The system of claim 1, wherein the machine-readable instructions cause the processor to:
    provide the user defined function.

3. The system of claim 2, wherein the machine-readable instructions cause the processor to:
provide a query that includes the user defined function.

4. The system of claim 3, wherein the machine-readable instructions cause the processor to:
execute the query to retrieve the data from the data source via the user defined function.

5. The system of claim 4, wherein the data is stored in the database.

6. The system of claim 5, wherein the query is composed of syntax that is associated with the query engine and syntax that is associated with the external data source.

7. A non-transitory machine-readable medium storing instructions for defining user function, the instructions executable by a machine to cause the machine to:
provide a user defined transformation function (UDTF) that gathers data from a data source platform external to a query engine, wherein the UDTF provides a function-scan that searches content from a non-table resource of the data source platform according to a particular function;
provide access to the UDTF via a plurality of programming classes, wherein the plurality of programming classes each include a number of user-defined parameters for gathering the data from the data source platform to the query engine, and enables a template that allows a user to communicate with the query engine and the data source platform;
execute via the query engine the UDTF received from the plurality of programming classes to gather the data from the data source platform;
receive data from the data source platform; and
store the data in a database.

8. The medium of claim 7, wherein the data source platform stores non-relational data and the query engine is associated with the database that stores relational data.

9. The medium of claim 8, wherein the data can be retrieved from the data source platform by executing the UDTF.

10. A method for defining user function comprising:
abstracting an interface to a data source platform via a plurality of programming classes;
implementing the plurality of programming classes using a plurality of parameters of the data source platform and a user defined transformation function (UDTF), wherein the UDTF provides function-scan that searches content from a non-table resource of the data source platform according to a particular function, wherein the plurality of programming classes each include a number of user-defined parameters for gathering the data from the data source platform, and enables a template allowing a user to communicate with the data source platform;
registering the UDTF with the query engine using the plurality of programming classes; and
executing the UDTF using the query engine to gather the data from the data source platform.

11. The method of claim 10, wherein executing the UDTF includes executing the plurality of programming classes.

12. The method of claim 10, wherein the plurality of programming classes include at least a function class and a function wrapper class.

13. The method of claim 12, wherein the function class includes instructions to connect a database to the data source platform and retrieving data from the data source platform.

14. The method of claim 13, wherein the function wrapper class includes an application programming interface (API) for registering the UDTF and parameters associated with the UDTF with the database.

* * * * *